Jan. 11, 1927.
J. R. SUMMERS
1,614,215
LIQUID GAUGE
Filed Dec. 4, 1924
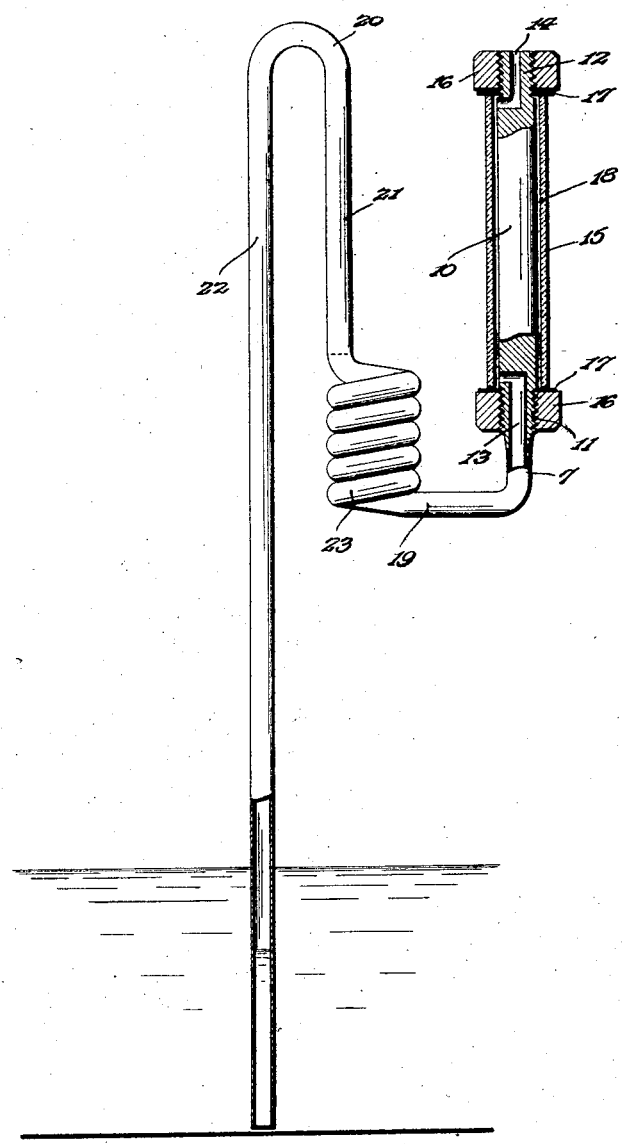
WITNESSES
INVENTOR.
BY J. R. Summers
ATTORNEYS.

Patented Jan. 11, 1927.

1,614,215

UNITED STATES PATENT OFFICE.

JOHN R. SUMMERS, OF TIFFIN, OHIO.

LIQUID GAUGE.

Application filed December 4, 1924. Serial No. 753,880.

This invention relates to an improved liquid level gauge and seeks to provide a simple and efficient device of this character adapted for general use and which will function to accurately register the depth of a liquid in a vessel, container or the like.

Other and incidental objects will appear hereinafter.

The figure of the drawing is a view of the gauge shown partly in vertical section and partly in elevation.

In carrying the invention into effect, I employ a rod 10 which is provided with threaded terminals 11 and 12 and formed in the lower end portion of the rod is an inlet passage 13 opening through one side of the rod at the base of the terminal 11. At its upper end, the rod is provided with a somewhat smaller passage 14 which opens through one side of the rod at the base of the terminal 12 and communicates with the atmosphere. Surrounding the rod is a gauge tube or glass 15 and screwed upon the terminals 11 and 12 of the rod are nuts 16 confining the gauge glass therebetween. Appropriate gaskets 17 are interposed between said nuts and the ends of the gauge glass and, as will be appreciated, the nuts may be adjusted for tightly compressing the gaskets so as to provide sealed joints at the ends of the glass. Preferably, the gauge glass is, as shown in the drawing, only slightly larger in diameter than the rod 10 so that a restricted annular chamber 18 is thus defined between the rod and the glass. The passage 13 communicates with the lower end of this chamber while the passage 14 vents the chamber at its upper end to the atmosphere, and suitable calibrations are provided upon the gauge glass to afford different depth readings.

Secured at one end to the terminal 11 of the rod 10, is a pressure tube 19 communicating with the passage 13 of the rod. In the present instance, I have shown the tube integrally connected to said terminal but, of course, the tube may, if preferred, be detachable. Formed in the tube is an upward bend 20 providing the tube with a short leg 21 and a long leg 22. At the lower end of the short leg 21, the tube is formed into a coil 23, the upper end of which lies slightly above the level of the inlet passage 13. This coil provides a container for a suitable indicating liquid which will thus normally stand in the chamber 18 at the level of the mouth of the passage 13. The bend 20 being above the upper end of the passage 14 prevents the liquid contained in the coil 23 rising in the leg 21 to a point to pass off by siphonic action. It should be remembered that the coil 23 is only partly filled with a suitable liquid which when displaced by pressure in the long leg 22 of the tube will rise in the sight gauge tube 15. However, should the liquid rise in the leg 21 from any cause it will not pass off because of the height of the bend 20 and the amount of the liquid initially supplied to the coil 23.

In use, the lower end of the pressure tube is, as suggested in the drawing, inserted in a suitable containing vessel to a point near the bottom thereof so that the liquid in the vessel will rise upwardly within the lower end portion of the tube. The column of air within the tube will accordingly be compressed so that the indicating liquid contained within the coil 23 will be caused to rise within the chamber 18 of the gauge for indicating the depth of the liquid within the vessel. The gauge glass 15 will, of course, be calibrated to correspond to the size of the vessel so that the gauge will accurately register the quantity of liquid present in the vessel.

Having thus described the invention, what I claim is:

1. A U-tube pressure gauge including a transparent gauge tube forming one leg of the U-tube, and a rod extending through the transparent tube and provided with a longitudinal passage leading into the lower end of said tube, and a pressure tube in communication with said passage and upwardly directed to provide the other leg of the U-tube.

2. A U-tube pressure gauge including a transparent gauge tube forming one leg of the U-tube, and a rod extending through the transparent tube and provided with a longitudinal passage leading into the lower end of said tube, and a pressure tube in communication with said passage and upwardly directed to provide the other leg of the U-tube and having the lower portion of the last mentioned leg formed into a coil to provide a container for an indicating liquid.

3. A U-tube pressure gauge including a transparent gauge tube forming one leg of the U-tube, and a rod extending through the transparent tube and provided with a longitudinal passage leading into the lower end of said tube, and a pressure tube in communication with said passage and upwardly directed to provide the other leg of the U-tube and having the lower portion of the last mentioned leg formed into a coil which is disposed with its upper end slightly above the level of the said passage.

4. A U-tube pressure gauge including a transparent gauge tube forming one leg of the U-tube, and a rod extending through the transparent tube and projecting beyond the same at both ends and having the projecting ends threaded, and having a longitudinal passage at each end leading into the said tube, nuts on the threaded ends of the rod engaging the ends of the tube, and a pressure tube in communication with the lower passage of the rod and upwardly directed to provide the other leg of the U-tube.

5. A U-tube pressure gauge including a transparent gauge tube forming one leg of the U-tube, and a rod extending through the transparent tube and projecting beyond the same at both ends and having the projecting ends threaded, and having a longitudinal passage at each end leading into the said tube, nuts on the threaded ends of the rod engaging the ends of the tube, and a pressure tube in communication with the lower passage of the rod and upwardly directed to provide the other leg of the U-tube and having the lower portion of the last mentioned leg formed into a coil which is disposed at a point below the said gauge tube.

In testimony whereof I affix my signature.

JOHN R. SUMMERS. [L. S.]